(12) United States Patent
Swanburg

(10) Patent No.: US 8,073,423 B2
(45) Date of Patent: Dec. 6, 2011

(54) INTELLIGENT INFORMATION CONTROL REPOSITORY

(75) Inventor: Scott Allen Swanburg, Duluth, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 556 days.

(21) Appl. No.: 11/753,735

(22) Filed: May 25, 2007

(65) Prior Publication Data

US 2008/0293375 A1 Nov. 27, 2008

(51) Int. Cl.
*H04M 11/00* (2006.01)
(52) U.S. Cl. .................. 455/405; 455/414.1; 455/414.2; 455/414.3; 455/418
(58) Field of Classification Search .................. 455/405, 455/414.1–414.3, 418, 425
See application file for complete search history.

(56) References Cited

U.S. PATENT DOCUMENTS

| | | | |
|---|---|---|---|
| 6,314,426 B1 * | 11/2001 | Martin et al. ........................ | 1/1 |
| 2006/0079201 A1 | 4/2006 | Chung et al. | |
| 2007/0061332 A1 * | 3/2007 | Ramer et al. ..................... | 707/10 |
| 2007/0156696 A1 * | 7/2007 | Lim ................................. | 707/9 |
| 2008/0071728 A1 | 3/2008 | Lim | |

* cited by examiner

Primary Examiner — Wayne Cai
(74) Attorney, Agent, or Firm — Moazzam & Associates, LLC

(57) ABSTRACT

Systems and methods are disclosed for alleviating the network congestion inherent in monitoring several million subscribers' usage by incorporating an Information Control Repository (ICR) at the user-level, ideally within the mobile device in the form of a software program. This Micro Intelligent Information Control Repository (MIICR) augments the user profile typically stored in the network-level IICR. The MIICR collects usage information at the user level such as keystrokes, application usage, and other information, and generates a sub-profile that can be stored on the device itself. This sub-profile may consequently be used to provide the user with an enhanced Adaptive User Interface, that dynamically changes based on the usage of the device. Additionally, the sub-profile may be used in conjunction with the network-level user profile stored on the IICR to provide enhanced services customized for the individual user.

18 Claims, 4 Drawing Sheets

INTELLIGENT INFORMATION CONTROL REPOSITORY

BACKGROUND OF THE INVENTION

1. Field of the Invention

The present invention relates generally to mobile communication. More particularly, the present invention relates to mobile devices and services having customized user interfaces generated by an intelligent embedded profiling engine and in conjunction with intelligence from the network.

2. Background of the Invention

With the advent of Internet Protocol (IP) and packet-based services offered to mobile users, the fusion between mobile devices and computers is well under way. Mobile users are now performing everyday tasks via mobile devices thanks to advancements in service models for applications. One such advancement has been the ability to monitor a single user's usage of applications, and to provide services and applications based on this usage. However, monitoring every user's actions can bog down even today's high-throughput IP-based networks. Thus, there is a need for a more efficient system and method for monitoring usage and providing customized services to a single user.

Mobile users are increasingly using their mobile devices for more than just conversations. The advent of wireless data plans means that subscribers now have access to resources that were previously available only on the Internet. There is increased demand for performing tasks on mobile devices that were traditionally performed on a computer. These include Instant Messaging (IM), downloading multimedia, peer 2 peer file sharing (p2p), location based services such as maps and traffic reports, billing inquiries, etc.

These services require implementation of multiple Application Servers (AS) on the mobile network, as well as authentication, enablers, and storage units to work together to provide a service model for multiple applications. One benefit of an IP-based network is the ability to incorporate these network elements in a flexible manner, so that they can be configured and reconfigured in a way to provide efficient allocation of resources. Thus, this plethora of services revolves around sophisticated, interactive applications provided by server subsystems that enable users to have access to one or more applications quickly and simultaneously, as well as toggle between such multiple applications at will with minimal effort.

Mobile operators have recognized that there is tremendous business potential for targeted delivery of applications and services to suit a specific user's tastes. Mobile operators also recognize that in order to provide customized services, they need to understand how the user interacts with existing applications and services. In fact, with today's high-speed 3G mobile networks, mobile operators have recognized that they may monitor a specific subscriber's usage, and present targeted content and services in near real-time. These service models allow subscribers to transform their services in a way that is revolutionizing the mobile industry.

One such service model involves dynamically generated user profiles that contain a mobile subscriber's application usage, browsing, and download habits. This dynamically generated profile is typically stored in an Intelligent Information Control Repository (IICR). The profile is analyzed, and relevant services are presented to the subscriber in the form of an Adaptive User Interface that presents services most relevant to that particular user, as well as multiple options to download or purchase additional content, or by presenting a user with options to access more information resources.

However, such a model is heavily dependent on several inputs, most of which come from the user end, and traverse the mobile network to reach the Application Servers and IICR. Such inputs may include a user's menu choices, application usage, communicating habits, as well as the type and frequency of information that is shared between applications. Considering that today's large mobile operators handle over 60 million subscribers, this results in a massive amount of data being uploaded over the mobile network. Additionally, most current 3G networks are optimized for high speed downloads, not uploads. Consequently, monitoring subscribers' usage to provide customized services becomes a dead-end goal: the more customization an operator wishes to offer, the more it bogs its own network down.

What is needed is an improved system and method to monitor a mobile user's habits while exploiting the current advances in mobile technology without overloading existing networks.

SUMMARY OF THE INVENTION

The present invention alleviates the network congestion inherent in monitoring several million subscribers' usage by incorporating an Information Control Repository at the user-level, ideally within the mobile device in the form of a software program. This Micro Intelligent Information Collection Repository (MIICR) augments the user profile typically stored in the network-level IICR. The MIICR collects usage information at the user level such as keystrokes, application usage, and other information, and generates a sub-profile that can be stored on the device itself. This sub-profile may consequently be used to provide the user with an enhanced Adaptive User Interface, that dynamically changes based on the usage of the device. Additionally, the sub-profile may be used in conjunction with the network-level user profile stored on the IICR to provide enhanced services customized for the individual user.

The advantage of incorporating a MIICR at the user level is that information generated at the user level can be analyzed and aggregated at the user level, without inundating the mobile network with every possible piece of information. The MIICR maintains 2-way communication with the network-level IICR, and sends packets of information only when absolutely necessary or relevant. Thus, another advantage is that processor resources on the network-level are freed up to perform other tasks such as monitoring community profiles and offering custom services to larger groups of subscribers.

In one exemplary embodiment, the present invention is a network system including a Dynamic Event Server Subsystem (DESS) including a plurality of Application Servers and an IICR, wherein a mobile device having its own MIICR incorporated is in communication with the DESS over an IP-compliant or equivalent packet-based network.

In another exemplary embodiment, the present invention is a method for generating a customized user interface for a mobile user wherein the user's application usage and other habits are monitored by an MIICR and stored in a sub-profile. This sub-profile may be augmented with the user profile stored at the network-level IICR, and the resulting information can be used to generate a customized user interface for the mobile user, wherein any changes made to the profile by the subscriber's own usage are reflected in the customized user interface in real-time.

DETAILED DESCRIPTION OF THE INVENTION

Figure 1:
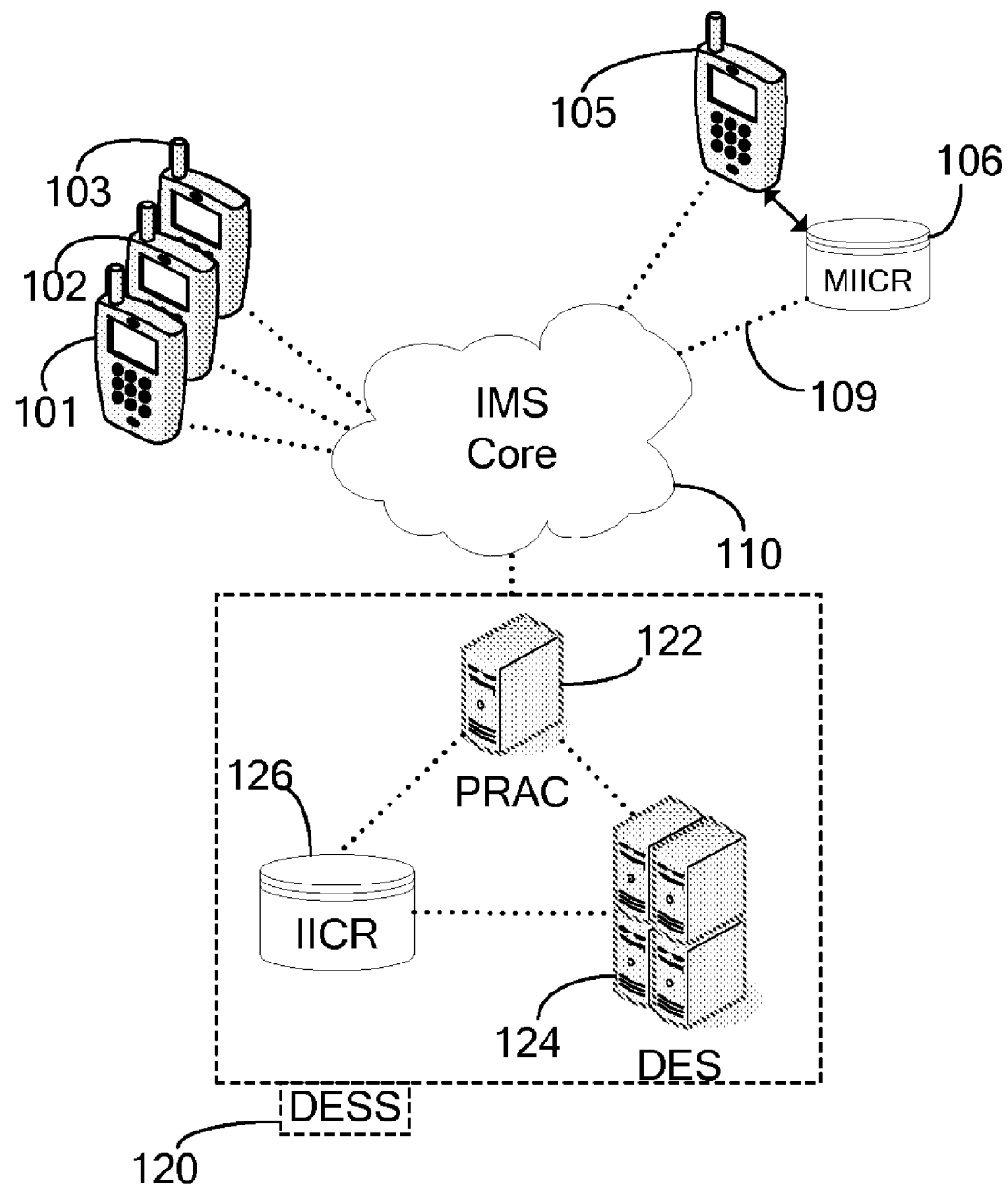
FIG. 1 shows a Micro IICR among typical network elements, according to an exemplary embodiment of the present invention.

The present invention incorporates a Micro-Level IICR (MIICR) into a mobile user's mobile device to augment the user's profile that is typically generated by a macro network-level IICR (IICR). The MIICR may be incorporated into a mobile device, or is placed anywhere on the network end points. This could be a set top box or any terminal device on the network which collects input from a subscriber. The MIICR monitors several inputs for new information such as usage, application interaction, etc., and generates a sub-profile for the user. This sub-profile may be used in conjunction with the user profile generated by the IICR to generate Scenario Based Services (SBS) that are accessible via an Adaptive User Interface—a dynamically evolving user interface that offers functions and services catered to the specific user. Since the MIICR performs at the user level many tasks that the IICR would perform at the network level, one advantage of the present invention is a reduction in network congestion and resources. Other benefits and advantages will be apparent to one skilled in the art.

A mobile device for the purposes of this disclosure includes any communications device with the ability to send and/or receive data across IP or any related packet-based networks, as well as devices capable of communicating over PSTN or other legacy networks. For the purposes of this disclosure, the terms "user," "mobile user," and "subscriber" may be used interchangeably.

Since the present invention resides within an IP Multimedia System (IMS) environment it is helpful to define this term and all related terms. IMS describes a system by which mobile operators can offer and charge for discrete services that are usually available on the internet, alongside current services being offered. This architecture works with any packet-switching network, is IP-based, and therefore has tremendous potential for services like VoIP, push-to-talk, videoconferencing, IM, and other applications. In an IMS environment, the preferred signaling protocol is the Session Initiation Protocol (SIP). SIP allows two elements in a network to find each other and open lines of communication easily, and is a significant part of IMS. Ideally every mobile device and network element has a unique SIP address for the purposes of this disclosure, and communication between these servers and mobile devices traverses the Proxy Registration Authentication Collection (PRAC) server.

Applications are typically hosted on Application Servers (AS). A Dynamic Event Server Subsystem (DESS) as used herein is a network system that contains network enabled Application Servers dynamically offering services to mobile terminals with dependency on contextual usage. This system creates an efficient way in which to launch these applications, authenticate their use, store data associated with the usage of individual applications and the interaction between associated applications at the macro network level. Multiple levels of communication include interaction between the mobile device/client and the applications server (AS), between multiple application servers, and between multiple servers at which time the subscriber state change is collected.

The term Scenario Based Services (SBS) is used to describe a setup in which a suite of applications is made available for use during differing scenarios and contexts. Interactive applications communicate with the user and among themselves using SIP signaling over an IP network, compile data, and submit usage patterns to the macro network-level Intelligent Information Control Repository (IICR). The IICR compiles this usage information in a user profile, and generates an array of services that are user-specific and dynamically evolving. The intelligent push and pull of applications foster communications across specific communities of interest. Additionally, an Adaptive User Interface is created, which allows for a user defined customizable "desktop" accessing ability for using multiple applications simultaneously. The presentation of such universal information may be based on community or individual preferences.

The present invention describes a Micro-level IICR (MIICR) that collects information that is generated at the user level. FIG. 1 shows the location of the MIICR 106 according to an exemplary embodiment of the present invention. Several mobile devices 101-103 and 105 communicate with each other and with a Dynamic Event Server Subsystem (DESS) 120 over an IMS-compliant network 110. DESS 120 comprises a plurality of Application Servers in DES 124, as well as an IICR 126. Applications hosted by DES 124 include but are not limited to Instant Messaging (IM), Media Server (MS), web browsing, and location server. Communication between network elements is monitored and enabled via SIP servers acting as PRAC servers 122. PRAC servers 122 also interface to the IMS core 110, and control user access to a particular AS.

Network elements within DESS 120 and within IMS Core 110 may comprise either hardware, computer programs, or any combination of both. Communication between these network elements may include SIP, as well as any equivalent packet-based signaling and/or transport protocols. Mobile devices 101-3 and 105 may be any combination of mobile phones, personal computers, PDAs, or any equivalent device that is capable of wired or wireless communication over a packet-based network.

Figure 3:
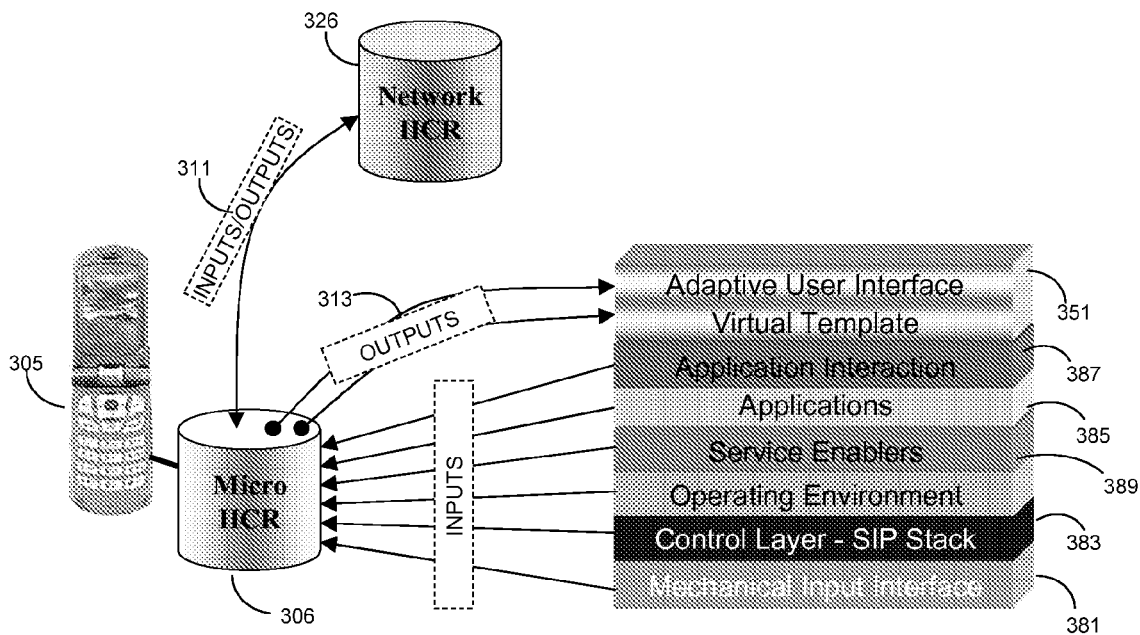
FIG. 3 shows information collected by an MIICR, according to an exemplary embodiment of the present invention.

Typically, when a user of mobile devices 101-103 performs an action such as executing a particular application, this action is recorded by the respective AS in DES 124, and is submitted to the IICR 126. Along with other similar usage information, IICR 126 creates user profiles in real time based on information available in a network as well as information generated by applications on devices 101-103. This information can come from a user's interaction with the network, with applications on a user's mobile device, or from any other source, and includes but is not limited to usage patterns, purchases via mobile device, billing, web browsing habits, song/video downloads/purchases, user location, user-defined preferences, as well as peak usage dates and times, protocols used, as well as similar information from other mobile subscribers' profiles. FIG. 3 is representative of the types of information that may be collected by an IICR. Patterns of usage and other preferences from the user profile are then made available to applications and services in the network so that those applications and services can assist the user in the performance of his daily tasks.

However, as described earlier, millions of subscribers performing multiple tasks daily results in enormous amounts of data being transferred through the network. Thus, MIICR 106 is implemented at the user level. Mobile device 105 contains this MIICR 106 in the present embodiment. MIICR 106 may be a computer program unit stored onboard the memory of mobile device 105 as software or incorporated within the hardware. MIICR 106 is able to store certain information regarding certain elements of the user profile on the device itself, creating a sub-profile for the user. MIICR 106 may also filter and sort the information from this sub-profile into relevant packets, and forward these packets 109 to the network-level IICR 126 to be appended to the user profile stored in the IICR 126. Since MIICR 106 performs this intelligent sorting and prioritizing of information at the user level, and only submits relevant information to IICR 126, both bandwidth and processing resources are reduced across the mobile network.

Figure 2:
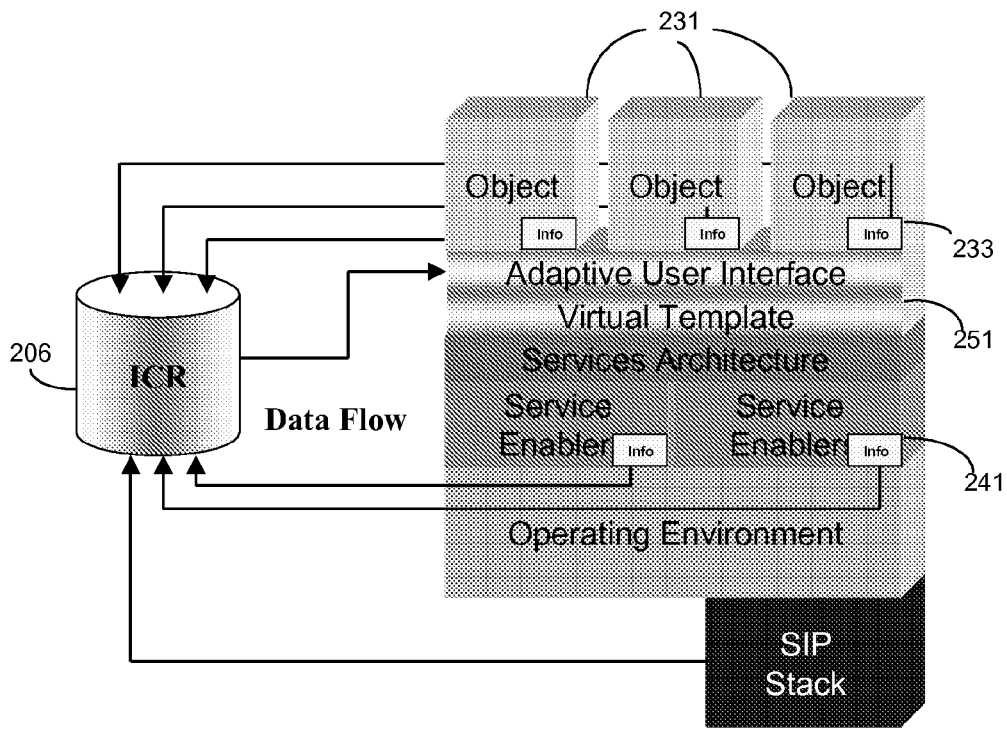
FIG. 2 shows function of an Information Collection Repository, according to an exemplary embodiment of the present invention.

As alluded to earlier, a basic purpose of an Intelligent Information Collection Repository is to receive usage and interaction information from numerous sources and to create patterns of usage, leading to a user profile that may be used by intelligent applications to provide customized services to a particular subscriber. FIG. 2 shows an exemplary Information Control Repository (ICR) Architecture according an embodiment of the present invention. Objects 231 include applications, applets, and other services, and may be hosted either on an AS or on the user end. Additionally, common elements between different objects can be determined, and "tagged." These information tags 233 may include common database fields, user inputs such as names/addresses, etc., or any common element that may be shared between objects. Similarly, Service Enablers 241 also contain information tags that can be used by ICR 206 to augment the user profile. As multiple objects 231 are acted upon by the user, these actions are monitored and stored by ICR 206. ICR 206 thus dynamically creates and stores a user profile based on the actions.

The patterns in this user profile may be fed back to the Adaptive User Interface Virtual Template 251. The Adaptive User Interface is further elaborated upon in FIG. 4. These user profiles can be visually represented at the Virtual Template Layer 251, Applications Layer or within object 231 itself. For instance, a certain frequency of usage for a particular object may be recorded in ICR 206 and output to the Adaptive User Interface 251 in the form of a menu item. Alternatively, a certain regular input while using an object 231 may be fed back to the object itself, so that the user does not have to perform the same action repeatedly. There is a plethora of inputs that ICR 206 may add to the profile and feed back to various network elements. Thus, the user's behavior pattern and past use of function and contacts have an impact on the applications that may be presented to the user in future use of the device.

FIG. 3 is representative of the plethora of information that an Information Control Repository such as the MIICR monitors, according to an exemplary embodiment of the present invention. This list represents but a fraction of the information that may be relevant in generating a user profile. The information can be classified in four categories: mechanical input 381, control layer signaling 383, application usage/interactivity 385, and other information.

Mechanical input 381 comprises user interaction of the mechanical interface from device 305, and includes user keystrokes, menu selections (a series of logical selections based on menu representations), common form elements (such as names and addresses), etc. This information is especially useful in determining functional aspects of Adaptive User Interface 351, such as menu trees and auto-filling of forms.

The Control Layer Signaling Interface 383 monitors arbitration performed between IMS core 110, network elements and servers in the system. Input is received from these Control features of the Session Initiation Protocol (SIP) that incorporate embedded application enablers such as Transport Protocols (QoS, IPv6, IPv4, RAB), Security (IMS AKA, USIM, ISIM, IPSec), IMS Kernel (File Mgmt, Media Mgmt, Player/Rec, Streaming), and Multimedia CODECs. This input is stored in MIICR 306 for purposes of providing personalized and efficient allocation of resources for a specific user's needs, and is useful for determining network bottlenecks and usage statistics.

Application usage 385 comprises statistics on an individual application. For instance the type, frequency, time of day, and extent of use for an application. As individual applications are launched, counters for usage are invoked and sent as input to MIICR 306. Additionally, applications, key strokes/mechanical inputs, and menu selections may be tracked and used as input to MIICR 306. Similarly, application interaction 387 includes the frequency and conditions under which two or more applications communicate for various reasons. This communication may include sharing user information common between the two applications, or any other information required to run either application, and can be termed Application Dependency. Certain applications will interact with each other as a portion of services. For instance, a local calendar application could be linked with an address book so that people, places and time could be associated. These associations represent a collaboration of applications which result in a state change. These state changes are also used as input into MIICR 306.

Finally, other information includes Service Enabler information 389, application priorities, and other usage statistics and personal information for a user. Enablers 389 can include IMS Messaging, Location Based Services (AGPS), and Local Address Book as examples. As these enablers are engaged they may interact with each other. This interaction provides another form of input to be relayed over to MIICR 306.

Other information also includes data stored on the network-level IICR 326. There may be a specified interval for exchange of information 311 between Network IICR 326 and MIICR 306. Information pertinent to the individual subscriber compiled from network sources such as applications servers or other network elements will be periodically downloaded as input to MIICR 306.

MIICR 306 not only provides a mechanism for data collection but also acts on the data to provide intelligence which included pattern matching, usage dynamics, and output in the form of user interface recommendations. For instance, MIICR 306 may provide best path recommendations based on usage of buttons to applications and/or menu picks. MIICR 306 may also recognize patterns of association between the applications related to state changes and incorporate these patterns within the Adaptive User Interface 351. In addition, as described below, MIICR 306 may incorporate usage statistics such as most frequently used application and/or features, and output 313 those to the Adaptive User Interface 351.

Figure 4A:
FIGS. 4A-C respectively shows an Adaptive User Interface Virtual Template, and subsequent changes in the User Interface, according to an exemplary embodiment of the present invention.

The combination of this information can be powerful in providing relevant services. To efficiently use this information, the MIICR at the user level starts with a template, as shown in FIG. 4A. The Virtual Template is the "Home Screen" of the Adaptive User Interface 351. The final representation of this screen is the human interface that results from input from the subscriber as well as input from the MIICR and Network IICR. The MIICR makes recommendations based on input from these three sources and then displays the output appropriately. According to an exemplary embodiment of the present invention, Virtual Template 400 is divided into three areas. Standard output elements 411 are provided by most mobile operators, and may include items such as signal strength, IMS session on/off, time, date, etc. The application area 413 is represented by icons which represent applications that are currently open, or available for use in a multitasking environment. This toolbar acts as a launch pad for applications/services. When recommendations or usage statistics are updated in the user profile, the MIICR modifies this area by adding icons to the area for action. The dynamic feedback screen 415 displays general-purpose information that is output by the MIICR. This area is dynamic in nature in that changes are made in real time. It is static in that the subscriber ultimately configures which applications will display here and what interval they are to react to input.

For example, the subscriber may elect to choose weather, college football, and traffic delays in this area. The subscriber's preferences remain static; whereas the content within these preferences changes dynamically based on state changes in the MIICR. The MIICR may work with or without additional information from the network-level IICR. Combinational intelligence is sharing of information between the MIICR and the IICR to offer relevant services. The Network IICR and MIICR collaborate periodically in order to update the overall profile of any subscriber. For example, assume that the network-level IICR contains a user profile that includes the user's GPS coordinates, home and work addresses, and regular traffic updates. In addition, the MIICR contains usage details for applications, including a mapping application regularly used by the subscriber. MIICR may synthesize this information into providing relevant traffic updates and mapping services to the user dynamically in real time. The same concept can be applied to weather, sports scores, and other applications that will be evident to one skilled in the art.

Figure 4B:
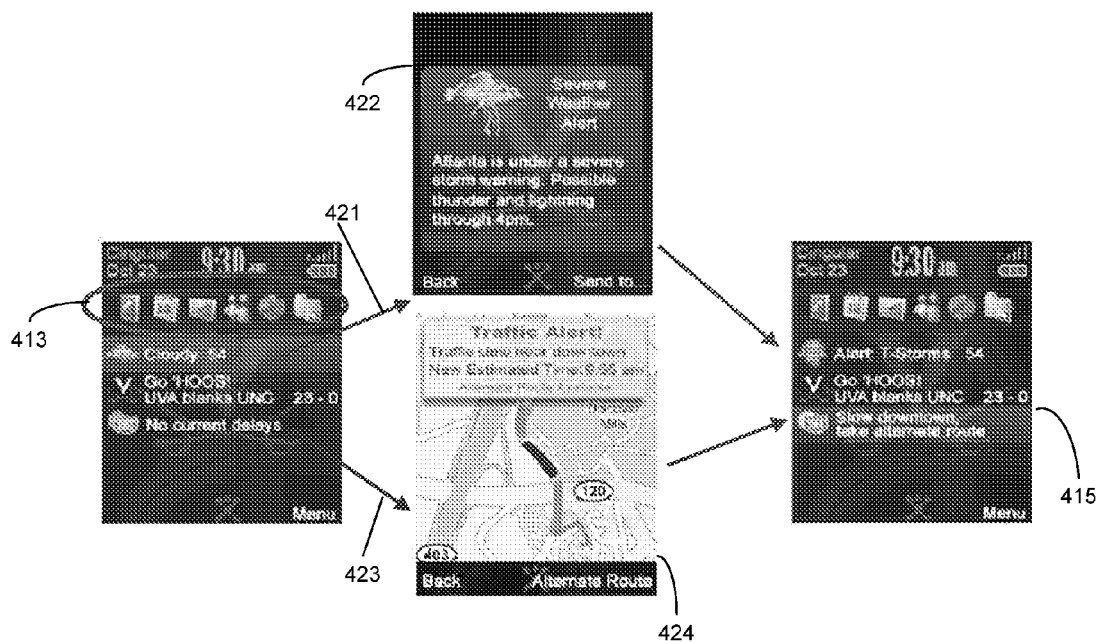

FIG. 4B shows an application of such user-defined updates. As previously stated the subscriber has the opportunity to configure his own Home Screen within the bounds of the predefined Virtual Template. Subscriber has the option to download new applications into the application/service toolbar 413. He may also take input from the MIICR and allow the mobile end device to place icons and/or configure the home screen automatically. In its default state, the MIICR will direct the placement of the application/service icons based on a "most used" condition, e.g., the applications/services with the highest frequency of use will roll to the first position of the toolbar 413.

When the subscriber is running an application, state changes are recorded within the MIICR, and dynamically fed back to the application based on new information supplied by the network. This information is compiled at the MIICR and then acted upon based on preset rules of the application and/or direction from the subscriber. In the present embodiment, the subscriber has asked to be informed when states are affected for weather and traffic. Alerts are used to inform the subscriber of an interaction and then push the information in a concise form to the Home Screen Updates area. FIG. 4B shows two unique state changes in process. In state change 421, a severe weather warning is fed back from the MIICR to the weather application 422 currently running on the user's device. This state change is presented in a dynamic update of the Home Screen 415. In state change 423, a traffic alert changes the state and is fed back to the mapping software 424 running on the user's device. The associated Update is presented to the home screen 416 for the traffic application.

Figure 4C:
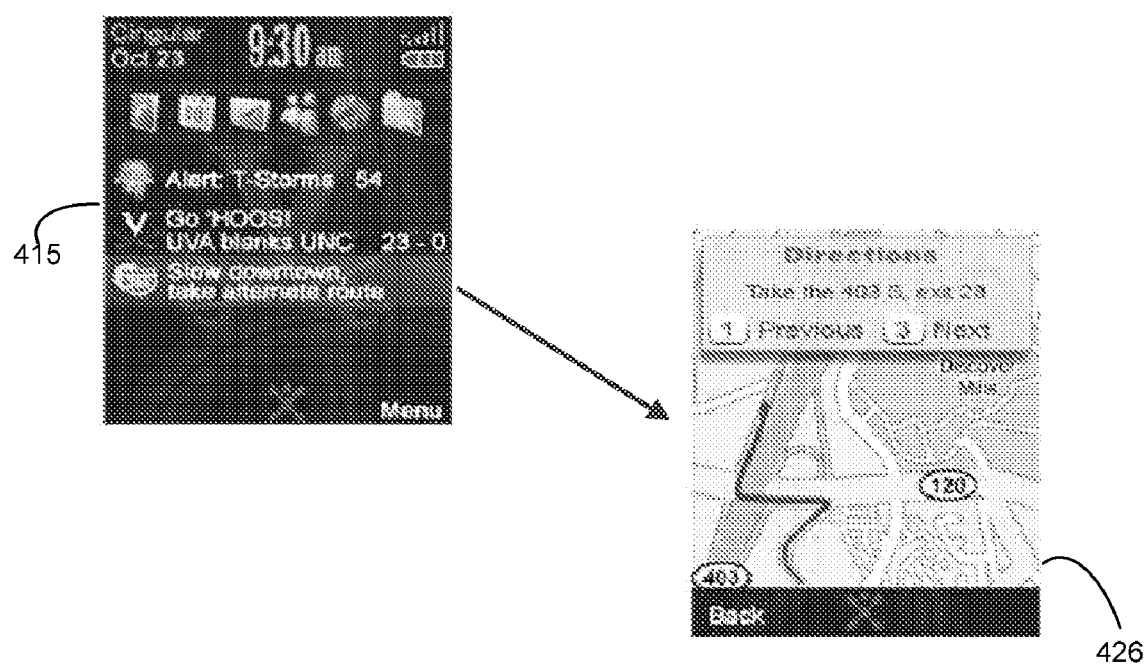

As mentioned earlier, the MIICR and network-level IICR collaborate to synthesize information and update the user profile. FIG. 4C shows the effects of such a profile. This subscriber is known to take the same traffic route on weekdays. Because an alert was sent from the network to the mobile end device in regards to a traffic problem from the "most used route" a second order of intelligence is applied in combination with the Network IICR and the MIICR. The MIICR is notified of an alternative route and pushes this new state information to the subscriber to act on. The subscriber accepts the recommendation and the Home Screen 415 automatically launches a map application 426 with an alternate route. This alternate route information is stored in the mobile device and updated to the overall subscriber profile in the network IICR at a later time/date when network traffic levels are low.

Thus, it should be apparent to one skilled in the art that the MIICR provides many benefits that were previously unrealized. Placing an information collection repository at the user-level for the purposes of monitoring usage and providing feedback significantly alleviates the load on the mobile network. In addition, the MIICR can perform tasks at the user level, allowing the network level IICR to perform higher tasks, and the synthesis of information in both Information Collection Repositories allows mobile operators to provide more relevant dynamic services and applications to mobile users.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A network system for collecting usage information for a mobile user, the network system comprising:
    a plurality of Application Servers on a communications network, the plurality of application servers having a plurality of interactive applications;
    an Intelligent Information Control Repository (IICR) on the communications network, the intelligent information control repository compiling a first user profile on a mobile network based on the mobile user's interactions with the plurality of interactive applications;
    a Micro Intelligent Information Control Repository (M-IICR) on a subscriber's mobile device, the micro intelligent information control repository compiling a user sub-profile on the mobile device based on a collection of data generated at the user level; and
    an adaptive user interface on the mobile device, the adaptive user interface dynamically updated to reflect changes made in the user profile and the user sub-profile, wherein said data generated at the user level and stored in the sub-profile includes one or more of mechanical inputs made by the mobile user, control layer signals, service enabler information, and the mobile user's usage of and interaction among applications that are hosted externally or on the mobile device, wherein the M-IICR filters and sorts the data generated at the user level into a plurality of relevant packets, and forwards said plurality of relevant packets at specified intervals to the IICR on the communications network to be appended to the first user profile, and wherein information pertinent to the mobile user is periodically downloaded as input to the M-IICR.

2. The network system of claim 1, wherein the plurality of Application Servers are part of a Dynamic Event Server Subsystem.

3. The network system of claim 2, wherein the plurality of Application Servers communicate with each other and with other network elements using Session Initiation Protocol.

4. The network system of claim 3, wherein the user's communication device is enabled to use Session Initiation Protocol.

5. The network system of claim 1, wherein interactive applications on the mobile device can be configured to have a custom user interface as desired by the user.

6. The network system of claim 5, wherein the interaction of applications on the mobile device and both Intelligent Information Control Repositories provides the mobile user with a custom user interface that is reflective of past uses of the mobile user with respect to an application.

7. The network system of claim 6, wherein the custom user interface is updated dynamically in real time.

8. A network system for providing a mobile user with an enhanced adaptive user interface on a mobile device, the network system comprising:

a plurality of servers on a mobile network, the plurality of servers having a plurality of interactive applications;

an Information Collection Repository on the mobile network, the information collection repository compiling a first user profile on a mobile network based on the mobile user's interactions with the plurality of interactive applications;

a second Information Collection Repository on the mobile device, the second information collection repository compiling a user sub-profile on the mobile device based on a collection of data generated at the user level; and an adaptive user interface on the mobile device, the adaptive user interface dynamically updated to reflect changes made in the user profile and the user sub-profile, wherein said data generated at the user level and stored in the user sub-profile includes one or more of mechanical inputs made by the mobile user, control layer signals, service enabler information, and the mobile user's usage of and interaction among applications that are hosted externally or on the mobile device, wherein the second Information Collection Repository filters and sorts the data generated at the user level into a plurality of relevant packets, and forwards said plurality of relevant packets at specified intervals to the first Information Collection Repository on the communications network to be appended to the first user profile, and wherein information pertinent to the mobile user is periodically downloaded as input to the user sub-profile.

9. The network system of claim 8, wherein the plurality of servers are part of a Dynamic Event Server Subsystem.

10. The network system of claim 8, wherein the plurality of servers communicate with each other and with other network elements using Session Initiation Protocol.

11. The network system of claim 10, wherein the mobile user's mobile device is enabled to use Session Initiation Protocol.

12. The network system of claim 8, wherein interactive applications on the mobile device can be configured to have a custom user interface as desired by the user.

13. The network system of claim 12, wherein the interaction of applications on the mobile device and both Information Collection Repositories provides the mobile user with a custom user interface that is reflective of past uses of the mobile user with respect to an application.

14. The network system of claim 13, wherein the custom user interface is updated dynamically in real time.

15. A method for collecting usage information for a mobile subscriber's use of a plurality of applications, said method comprising the steps of:

providing the mobile user with a plurality of interactive applications hosted by a plurality of application servers;

compiling a first user profile on a mobile network based on the mobile user's interactions with the plurality of interactive applications;

compiling a user sub-profile on the mobile device, the sub-profile including data generated by the mobile user's mechanical inputs, control layer signals, service enabler information, and interactions with the plurality of applications;

receiving a plurality of relevant packets from the user sub-profile stored on the mobile device at specified intervals;

appending the first user profile with said plurality of relevant packets;

periodically transmitting information pertinent to the mobile user as input to the user sub-profile; and dynamically updating an Adaptive User Interface on the mobile device, the update reflecting changes made in the user profile and the user sub-profile.

16. The method of claim 15, wherein the network elements communicate using Session Initiation Protocol.

17. A method for providing a mobile user with an enhanced adaptive user interface on the mobile user's mobile device; said method comprising the steps of:

providing the mobile user with a plurality of interactive applications hosted by a plurality of application servers;

compiling a first user profile on a mobile network based on the mobile user's interactions with the plurality of interactive applications;

compiling a user sub-profile on the mobile device, the sub-profile including data generated by the mobile user's mechanical inputs, control layer signals, service enabler information, and interactions with the plurality of applications;

filtering and sorting information in the user sub-profile into a plurality of relevant packets;

transmitting the plurality of relevant packets to the mobile network to be appended to the first user profile at specified intervals;

periodically downloading information pertinent to the mobile user as input to the user sub-profile; and dynamically updating the adaptive user interface on the mobile device based on a synthesis of the user profile and the user sub-profile.

18. The method of claim 17, wherein the network elements communicate using Session Initiation Protocol.

* * * * *